July 11, 1939.  F. A. STRUCK  2,165,684
PORTABLE LIQUID CONTAINER AND MEANS FOR FILLING THE SAME
Filed March 8, 1937  3 Sheets-Sheet 1

INVENTOR.
FREDERICK A. STRUCK.
BY
ATTORNEY.

July 11, 1939.  F. A. STRUCK  2,165,684
PORTABLE LIQUID CONTAINER AND MEANS FOR FILLING THE SAME
Filed March 8, 1937   3 Sheets-Sheet 2

INVENTOR.
FREDERICK A. STRUCK
BY
ATTORNEY.

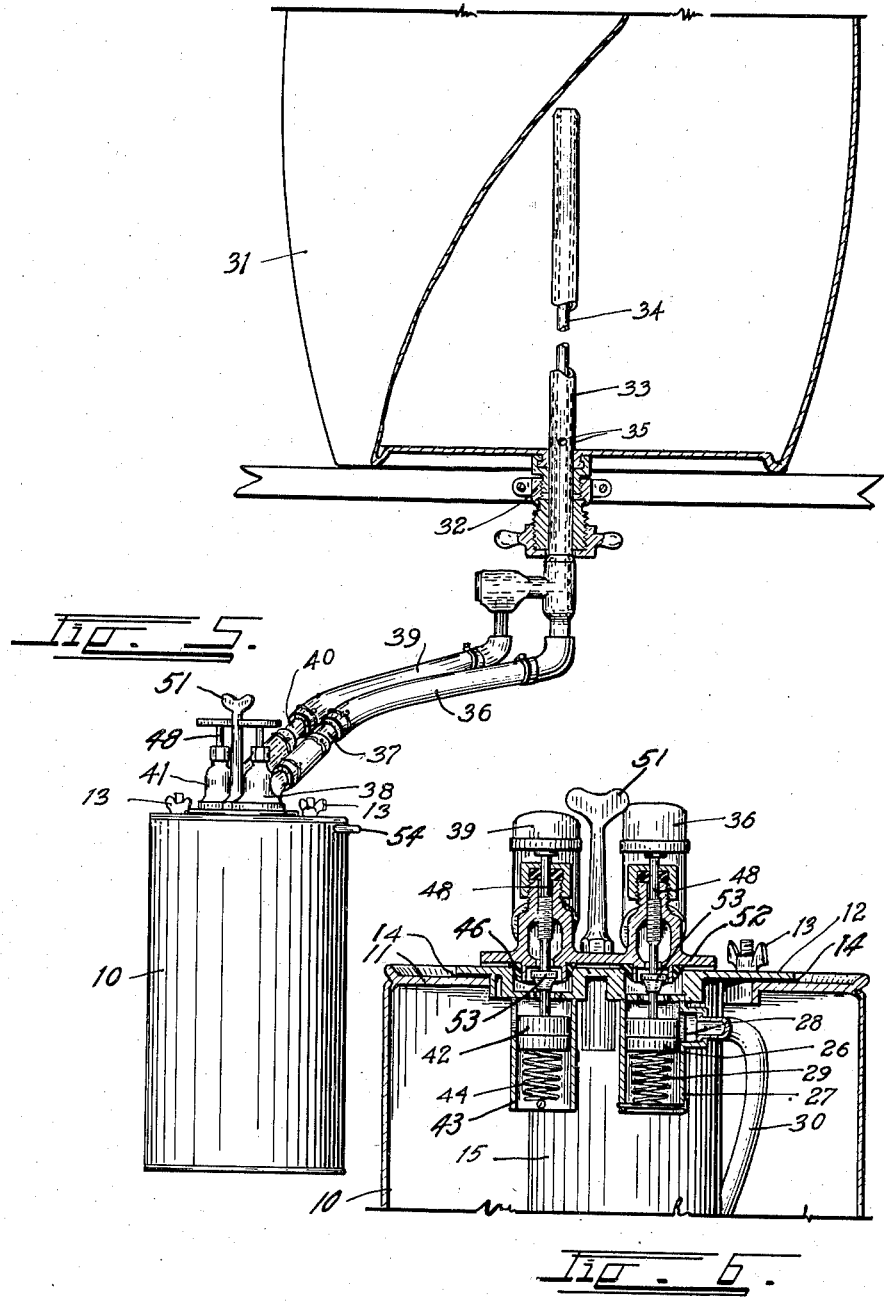

Patented July 11, 1939

2,165,684

UNITED STATES PATENT OFFICE 2,165,684

PORTABLE LIQUID CONTAINER AND MEANS FOR FILLING THE SAME

Frederick A. Struck, Golden, Colo.

Application March 8, 1937, Serial No. 129,606

7 Claims. (Cl. 226—115)

This invention relates to a portable beer dispenser and has for its principal object the provision of a portable container in which, from the time the container is filled until the last drink is drawn, the beer will be constantly and uniformly maintained under the same pressure it was in the original barrel.

Draft beer is packed by the breweries in kegs or barrels. If this beer is drawn from the barrel in bulk into a container it soon loses its richness and flavor due to the escape of the gas therefrom, and if allowed to stand in the container for any length of time it will become stale, flat and undrinkable. With the use of this invention, however, the beer is maintained under pressure while it is being transferred to the portable container and while it is being dispensed from the container so that at no time is it possible for the gas to escape from the beer and the flavor is maintained exactly as it was in the original barrel.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 5 illustrates the mechanism for drawing the beer from the original package into the portable container.

Fig. 6 is a detail view through the filling valves.

Figures 1, 2:
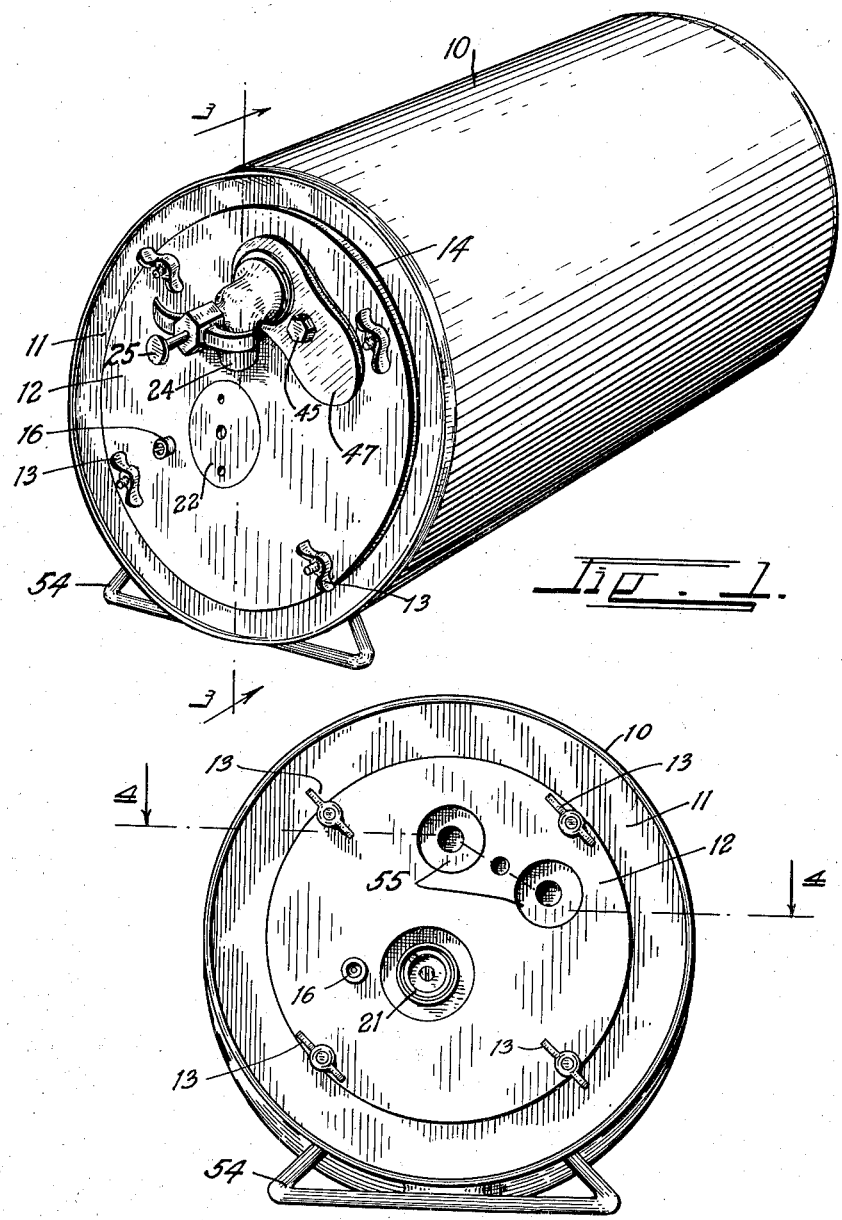
Fig. 1 is a perspective view of the improved portable container in the dispensing position.
Fig. 2 is a front view thereof with the spigot plate and valve cover removed.
Figure 3:
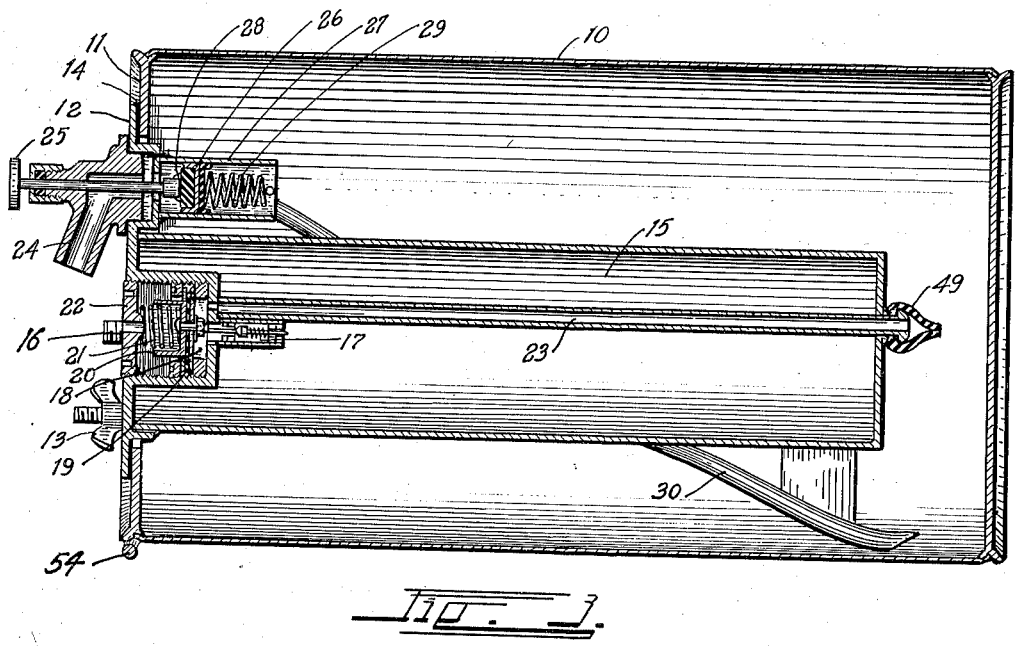
Fig. 3 is a longitudinal section taken on the line 3—3, Fig. 1.
Figure 4:
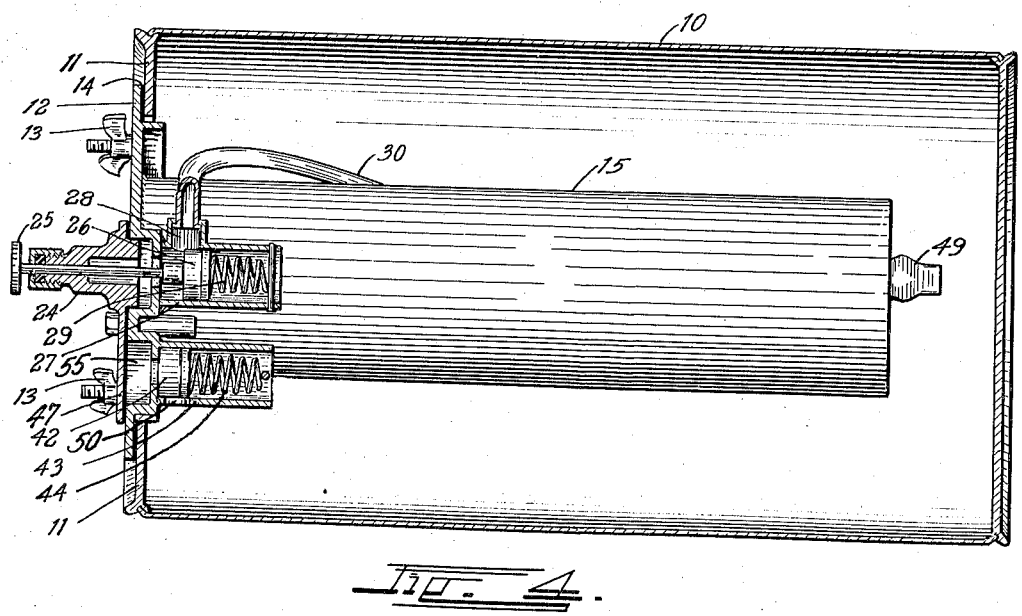
Fig. 4 is a similar section taken on the line 4—4, Fig. 2.

The invention comprises a container 10 having a closed bottom and a flanged top as shown at 11. The flanged top is closed by means of a cover plate 12 which is held in place through the medium of suitable thumb nuts 13. A gasket 14 is placed between the plate 12 and the flange 11 to seal the container.

A compressed air reservoir 15 is supported by and extends inwardly from the cover plate 12 into the container 10. Air under pressure is supplied to the air reservoir 15 through the medium of an air valve 16 which is preferably similar to the usual tire valve employed on automobile tires. Air discharges from the reservoir 15 through a similar tire valve 17 into a diaphragm chamber 18.

The diaphragm chamber 18 forms a pressure reducing valve for reducing the pressure of the air from the reservoir 15 before passing it to the container 10. The chamber is provided with a flexible diaphragm 19 against which a compression spring 21 is clamped. The spring 21 rests in a spring cup 20 on the diaphragm and is compressed by means of a threaded valve cover 22. The stem of the valve 17 projects sufficiently far into the diaphragm chamber 18 to be contacted by the diaphragm when the latter is bowed under the influence of the spring 21.

A discharge valve sleeve 27 and a vent valve sleeve 43 project inwardly from the cover plate 12 from adjacent valve openings therein. The discharge valve sleeve 27 contains a sleeve valve 26 which is normally held over a side port 28 by a compression spring 29. A discharge tube 30 extends from a point adjacent the bottom of the container to the port 28.

A similar sleeve valve 42 is positioned in the vent valve sleeve 43 to close a side port 50 opening to the interior of the container 10. The valve 42 is normally held closed by a valve spring 44.

The valve openings in the cover plate 12 to the latter two valves are covered by means of a spigot plate 47 held in place by an attachment screw 45.

The plate 47 carries a spigot 24 which, when the plate is in place, is positioned over the discharge valve 26. The spigot is provided with a thumb actuated plunger 25 by means of which the valve 26 may be pushed from the port 28 to allow the beer to discharge through the spigot. The remainder of the plate acts as a cover for the vent valve mechanism 42.

The beer should be kept under a pressure of from 10 to 15 pounds per square inch. The air in the reservoir may be under a pressure of anywhere from 50 to 100 pounds per square inch. The spring 21 is set so that a 10 to 15 pound pressure in the diaphragm chamber will compress the spring 21 and prevent the diaphragm from contacting the stem of the valve 17.

Now let us assume that the spigot plunger 25 is pressed to draw off the beer. The air pressure in the container forces the beer upwardly through the tube 30 and from the spigot. The discharge of this beer naturally lowers the pressure of the air in the container 10. This allows the spring 21 to move the diaphragm 19 and open the valve 17 to admit additional air from the reservoir 15 into the container 10 to replace the loss of pressure therein. Thus it can be seen that regardless of how much beer is drawn from the container 10, that remaining therein will always be kept under the original pressure.

In Figs. 5 and 6 the method of filling the dispenser is illustrated.

In Fig. 5 the original barrel or keg is indicated at 31. The barrel is inverted so that its bung will be at the bottom. A tap 32 is attached to the bung in the usual manner. This tap has a dispensing tube 33 in the place of the usual bung tube. Within the dispensing tube 33 is an air tube 34; the two tubes 33 and 34 are sealed together at their upper extremities. The upper extremity of the air tube 34 is open, however, and openings 35 are provided near the bottom of the dispensing tube 33 to allow the beer to flow from the barrel. The tubes 33 and 34 are sufficiently long to extend above the surface of the beer in the barrel. In Fig. 5, the mid-portions of the tubes have been broken away for convenience of illustration. The beer from the barrel is conducted through a hose 36 provided with a sight glass 37 to a beer valve housing 38. The air is conducted to the air tube 34 through an air hose 39 also provided with a sight glass 40 from an air valve housing 41.

The beer valve housing 38 and the air valve housing 41 are mounted on a valve plate 52. The plate is attached to the cover plate 12 by means of a long-handled, threaded stud 51 and replaces the spigot plate 47, the stud 51 being threaded into the socket formerly occupied by the screw 45. When the plate 52 is in place, the beer valve housing 38 is positioned over the discharge valve 26 and the air valve housing 41 is similarly positioned over the vent valve 42. The cover plate 12 is formed with depressions or sockets 55 over the valves 26 and 42. These sockets serve to align the plates 47 and 52 over the valves. The plate 52 is sealed to the sockets 55 by means of suitable compression gaskets 46.

The valve housings 38 and 41 are provided with threaded valve stems 48 which when screwed inwardly contact with and move the valves 26 and 42 from their ports. The stems 48 are also provided with valve flanges 53, which when the stems are screwed outwardly, contact with valve seats beneath the valve plate 52 to shut-off the flow through the hoses 36 and 39.

Before filling the container with beer the air reservoir 15 is first filled with compressed air. The reducing valve 18 allows sufficient air to pass to build up and maintain a pressure of approximately 15 pounds in the container 10. The tap 32 is now attached to the bung of the barrel 31 and the tube 33 is run into the barrel. Since this tube is sealed to the tap there is no escape of gas.

The spigot plate 47 is now removed and the valve plate 52 is attached in its place. The air and beer valve stems are now threaded inwardly. The stems first open the valve flanges 53 to establish communication with the hoses 36 and 39. Further movement causes the stems 48 to push the valves 26 and 42 away from their ports to establish communication with the container 10. This allows the air pressure in the container 10 and the barrel 31 to equalize so that the pressure becomes uniform throughout the system. The beer now flows by gravity through the openings 35, the hose 36, the valve housing 38, the valve sleeve 27, and the discharge tube 30 into the container 10. Naturally the beer entering the container 10 displaces air therefrom. This air flows back past the air valve 42, through the hose 39, and the air tube 34 to the top of the barrel 31 so that both the container and the barrel maintain their original pressure. The beer is allowed to flow until it is noted in the sight glass 40 of the air hose.

The valves are now unscrewed to allow the valves 26 and 42 to close and to bring the flange valves 53 to a closed position on the valve plate. This seals the hoses and also seals the container. The stud 51 is now unscrewed, the plate 52 is removed, and the spigot plate replaced. The dispenser is now ready for use.

The container may be provided with a supporting leg 54 which also serves as a carrying handle.

While the invention has been described as applied to the dispensing of beer, it is, of course not limited to this particular use but will be found valuable for the dispensing or storing of any liquid or fluid which it is desirable to maintain under constant uniform pressure at all times.

A rubber flap check valve 49 serves to prevent beer from entering the diaphragm chamber 18, should the air in the reservoir become completely exhausted. This valve however, does not interfere with the flow of air from the diaphragm chamber to the container 10.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A portable liquid dispenser comprising: a container; a cover plate closing said container; an air pressure reservoir supported by said cover plate and extending into said container; a pressure reducing valve interposed in the air path between said reservoir and said container so as to maintain a uniform pressure in said container; a vent valve supported by said cover plate; a filling valve supported by said cover plate; a valve plate; means for securing said valve plate over said vent and filling valves; a first valve stem on said valve plate for opening said vent valve; a second valve stem on said valve plate for opening said filling valve; and conduits extending from said first and said second valve stems to a source of supply.

2. A portable liquid dispenser comprising: a container; a cover plate closing said container; an air pressure reservoir supported by said cover plate and extending into said container; a pressure reducing valve interposed in the air path between said reservoir and said container so as to maintain a uniform pressure in said container; a vent valve supported by said cover plate; a filling valve supported by said cover plate; a valve plate; means for securing said valve plate over said vent and filling valves; a first valve stem on said valve plate for opening said vent valve; a second valve stem on said valve plate for opening said filling valve; a barrel tapping device; a pair of conduits connecting said first and second valve stems with said tapping device so that fluid may flow into said filling valve and air may simultaneously flow from said vent valve to said tapping device.

3. A portable beer dispenser comprising: a container having a flanged open extremity; a detachable cover plate closing said flanged extremity; an air reservoir supported by said cover plate and extending into said container; means for admitting air under pressure to said reservoir; a reducing valve for controlling the discharge of air from said reservoir to said container, said reducing valve being accessible through said cover plate; a first valve sleeve extending inwardly from said cover plate and provided with a filling port; a filling tube extending from said port to the lowermost portion of said container; a filling valve normally closing said port; a second valve sleeve projecting inwardly from said cover plate adjacent said first sleeve; a spring-closed, vent valve in said second sleeve, both of said sleeves opening through said cover plate; a removable valve plate covering both said valves; a pair of valves on said valve plate; means for connecting said latter valves with a source of supply; and means for causing operation of said latter pair of valves to also operate said filling valve and said vent valve.

4. In a beer dispenser, a container; a cover plate for said container; a filling valve opening through said cover plate; a vent valve opening through said cover plate; a valve plate secured over both valves; a filling conduit extending to said valve plate; a vent conduit extending to said valve plate; a second filling valve on said valve plate controlling said filling conduit; a second vent valve on said valve plate controlling said vent conduit, each of said latter valves having means for simultaneously actuating its corresponding valve on said cover plate.

5. Means for filling and sealing a container with fluid under gas pressure without loss of pressure in either the supply reservoir or the container comprising: a filling valve in said container; a spring acting to maintain said filling valve normally closed; a tube extending from said filling valve to a point adjacent the bottom of said container; a vent valve in said container; a spring acting to maintain said vent valve normally closed; a fluid conduit extending from below the fluid surface of a supply reservoir; an air conduit extending from above the fluid surface of said supply reservoir; a fluid valve closing the extremity of said fluid conduit; an air valve closing the extremity of said air conduit; means for securing said fluid and air valves to said container over said filling and vent valves, respectively; and means associated with each of said former valves for operating each of said latter valves.

6. Means for filling a beer container under pressure comprising: a spring-closed filling valve in the wall of said container communicating with the bottom thereof; a spring-closed vent valve in said wall; a fluid conduit; a fluid valve on the extremity of said conduit; an air conduit; an air valve on the extremity of said air conduit; means for securing said fluid valve and air valve over said filling valve and vent valve, respectively; and a valve stem projecting from each of said former valves to actuate each of said latter valves.

7. Means for filling a beer container under pressure comprising: a spring-closed filling valve in the wall of said container communicating with the bottom thereof; a spring-closed vent valve in said wall; a fluid conduit; a fluid valve on the extremity of said conduit; an air conduit; an air valve on the extremity of said air conduit, said filling and vent valves being adjacently positioned on said container; a valve plate carrying both said fluid valve and said air valve; means for securing said valve plate over said filling and vent valves to position the fluid valve over the filling valve and the air valve over the vent valve; a valve stem for each of said fluid and air valves, said stems projecting beyond said plate into contact with said filling and vent valves respectively so that the respective pairs of valves will open and close in unison.

FREDERICK A. STRUCK.